No. 656,682. Patented Aug. 28, 1900.
J. WESTAWAY.
APPARATUS FOR COMPRESSING PULP.
(Application filed Apr. 20, 1900.)

(No Model.) 3 Sheets—Sheet 1.

Witnesses
George D. Richards
Wm. R. Davis

Inventor
James Westaway
by W. H. Babcock
Attorney

No. 656,682. Patented Aug. 28, 1900.
J. WESTAWAY.
APPARATUS FOR COMPRESSING PULP.
(Application filed Apr. 20, 1900.)
(No Model.) 3 Sheets—Sheet 2.

No. 656,682. Patented Aug. 28, 1900.
J. WESTAWAY.
APPARATUS FOR COMPRESSING PULP.
(Application filed Apr. 20, 1900.)
(No Model.) 3 Sheets—Sheet 3.
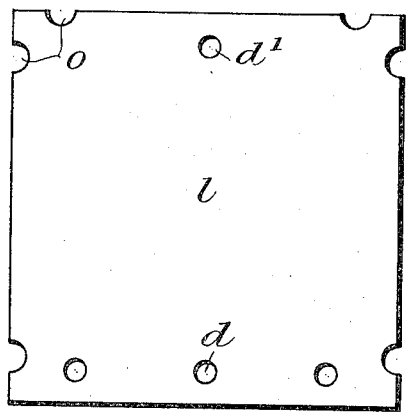
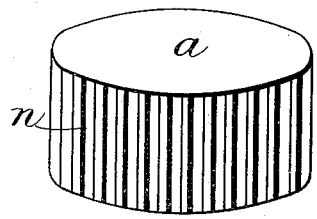
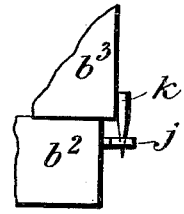
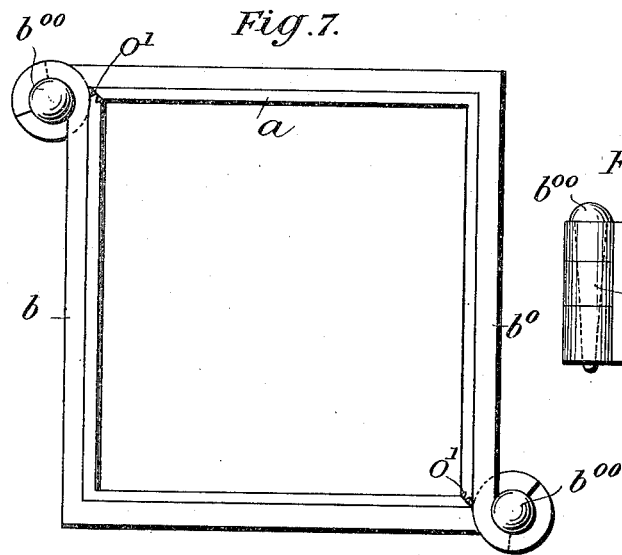
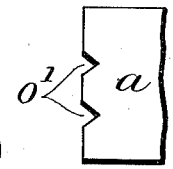
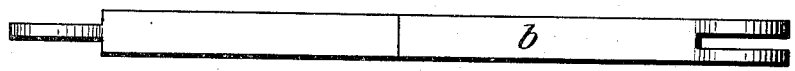

UNITED STATES PATENT OFFICE.

JAMES WESTAWAY, OF LONDON, ENGLAND.

APPARATUS FOR COMPRESSING PULP.

SPECIFICATION forming part of Letters Patent No. 656,682, dated August 28, 1900.

Application filed April 20, 1900. Serial No. 13,627. (No model.)

*To all whom it may concern:*

Be it known that I, JAMES WESTAWAY, engineer, a subject of the Queen of England, residing at 47 Clipston street, Fitzroy Square, London, England, have invented certain new and useful Improvements Relating to Apparatus for Compressing Leather or other Pulp and other Materials; and I do hereby declare the following to be a full, clear, and exact description of the invention, such as will enable others skilled in the art to which it appertains to make and use the same.

My invention relates to apparatus for compressing leather and other pulp, and is designed to be used in a press of suitable construction capable of developing a pressure of from four hundred to five hundred pounds per square inch or thereabout.

The apparatus is eminently adapted for compressing pulp formed from leather waste, cuttings, or clippings; but the waste or cuttings of any other fibrous or other material capable of being pulped or conglomerative powdered substances may be treated in the apparatus.

Figure 1:
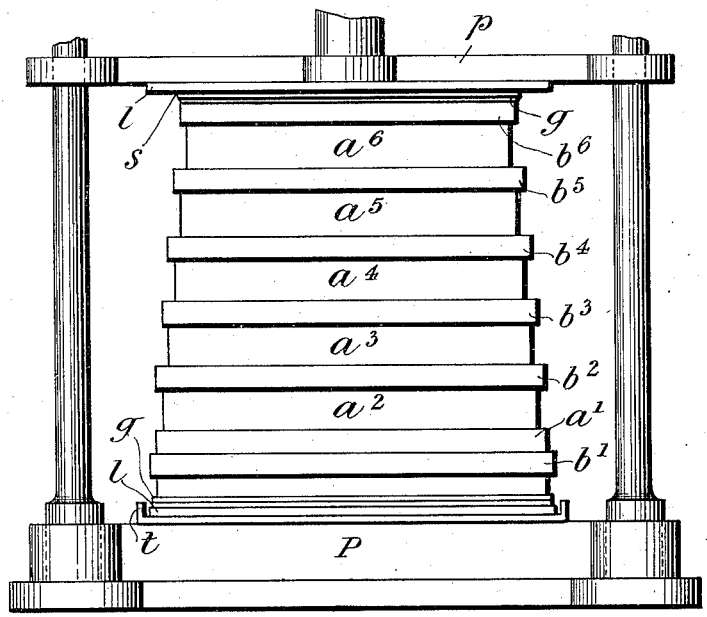
Figure 2:
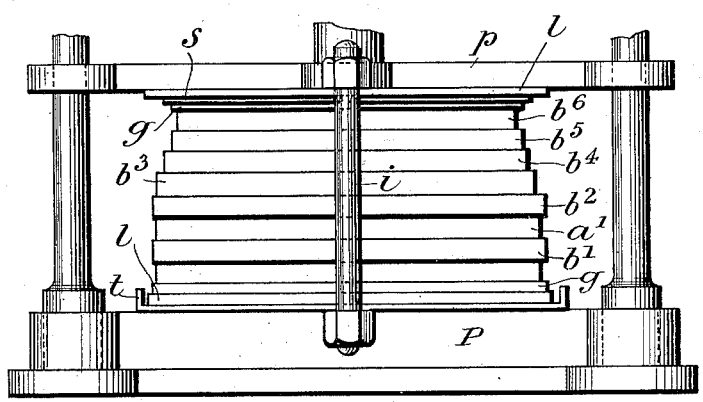
Figure 3:
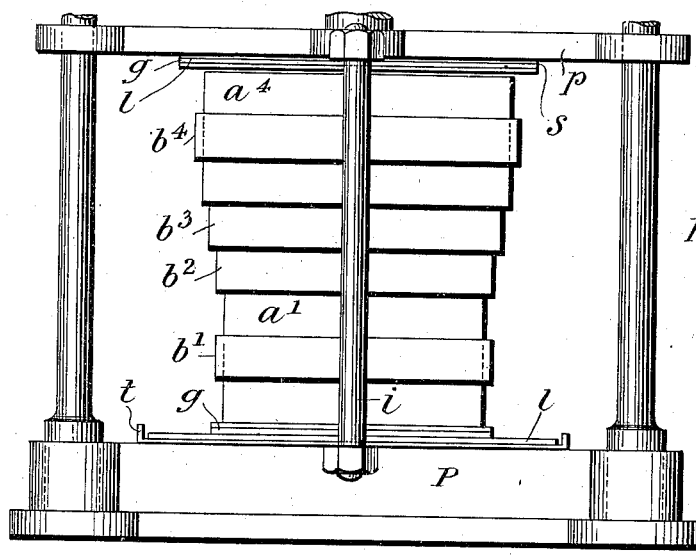
Figure 4:
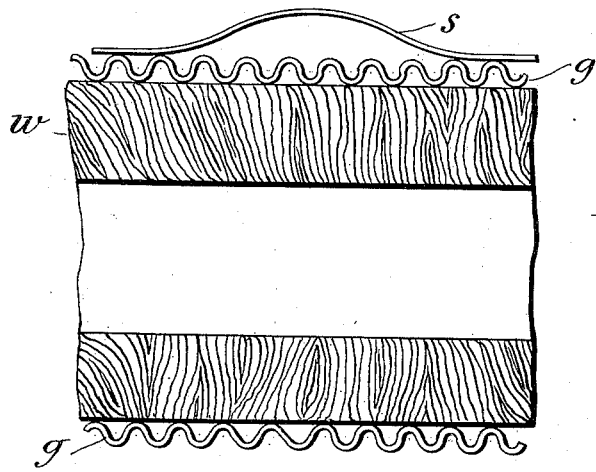
Figure 5:
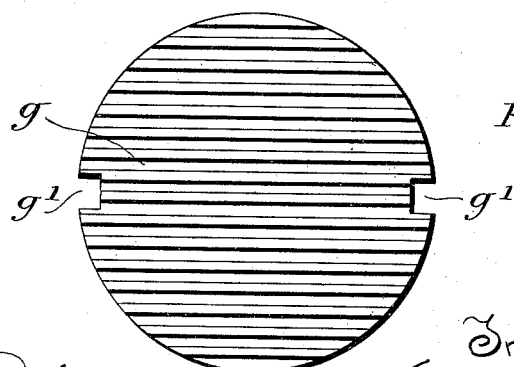

In the accompanying drawings, which are furnished in illustration of my invention, Figure 1 is a front elevation of the complete apparatus fitted in a press and ready for compression. Fig. 2 is a similar view of the same after compression. Fig. 3 is an elevation of a modification of my improved apparatus especially adapted to the treatment of powdered material, the series of molds being shown in inverted position as compared with the molds of Fig. 1 to allow the expressed liquid to run off easily. Fig. 4 is an enlarged vertical section of a portion of one of the molds forming part of my improved apparatus. Fig. 5 is a view of one of the grooved plates used in the apparatus shown in Fig. 3. Fig. 6 is a view of one of the locking-plates used in the apparatus shown in Figs. 1, 2, and 3; and Figs. 7, $7^a$, $7^b$, $7^c$, $7^d$, and $7^e$ are details of the molds and locking bars or rings therefor.

The same letters of reference wherever they occur are used to denote the same or corresponding parts in all the figures of the drawings.

In the construction and arrangement of my apparatus I use a number of superposed molds or receptacles $a'$ to $a^6$ of rectangular, Figs. 2 and 4, circular, Fig. 3, or of any other shape, each of which is larger than that which surmounts it and smaller than the subjacent mold, thus allowing the vertical row of molds to telescope one within the other to an extent limited by their surrounding locking or strengthening bars or rings $b'$ to $b^6$. The whole row of molds is placed between two locking-plates $l$, Fig. 6—one at the top and the other at the bottom—these plates being each furnished with corresponding bolt-holes $d\ d'$.

P is the base of the press, and $p$ its platen, a tray $t$ being placed on such base to receive the row of molds.

Each mold consists, as shown in Fig. 4, which is an enlarged partial view of the uppermost mold $a^6$, of an upper grooved plate $g$, a first or top layer $w$ of wood placed on the end fiber, a second or bottom layer of wood likewise placed on the end fiber, and, lastly, a second or lower grooved plate $g$. A spring blade or plate $s$ is placed on the top of the upper grooved plate $g$ of the uppermost mold $a^6$. (See Figs. 1, 2, and 3.) The locking-plates $l$, as shown in Fig. 6, as well as the corners of the various molds $a$, as shown in Fig. $7^e$, are notched, as shown at $o$ and $o'$, respectively, in Figs. 6 and $7^e$.

In Figs. 1 and 2, which show six molds more particularly adaptable for pulp, such as leather-pulp, each mold is, as above stated, surrounded by a metal ring or bar $b'$ to $b^6$. These metal rings or bars each consist of two rectangular bars $b\ b^0$, Fig. 7, the ends of which are shaped, as shown in Fig. $7^e$, one end being curved outwardly, while the other end is bent inwardly in such a manner that in connecting two of these bars around a mold the curved end of the one is inserted between the prongs of the other, and vice versa, and a bolt $b^{00}$, Fig. $7^d$, is then passed into the three loops of these ends, whereupon the bars $b\ b^0$ are tightly interlocked around the mold $a$, as clearly shown in Fig. 7. The notches $o$ in the locking-plates $l$, the notches $o'$ in the corners of the molds, and the grooves in the plates $g$ have for their object to allow the liquid to run off from the molds.

These molds having been arranged in the press in the manner shown in Fig. 1, the press is actuated and compression causes the molds to telescope one within the other and finally to assume the position shown in Fig. 2, whereupon the bolts $i$ are slipped through the bolt-holes $d$ $d'$ of the top and bottom locking-plates $l$, the front and rear ends of which extend sufficiently far out of the press for this purpose and are tightened in position by suitable nuts, as shown in Fig. 2, so as to allow the whole of the set of molds to be removed from the press as soon as the pressure is relieved and to be left under pressure for a certain length of time.

The vertical row or set of four cylindrical molds shown in the course of compression in Fig. 3 is more particularly adaptable for the compression of pulverized material. It is built up in the same manner as the quadrangular molds of Fig. 2; but when placed in the press for compression it is inverted, as clearly shown in Fig. 3, to allow the liquid to run off, this being facilitated by the marginal notches $g'$ in the grooved plates $g$, Fig. 5. These molds are preferably grooved on their outer periphery, as shown at $n$, Fig. 7$^a$, also for the purpose of carrying off expressed liquid, and the locking rings or bars $b'$ to $b^4$ (except the uppermost one) each have a pin $k$ at one side (see Fig. 7$^b$) and an eyelet $j$ at the other, the pin $k$ of one ring or bar engaging with the eyelet $j$ of the ring or bar, below which in its turn engages by its pin $k$ the eyelet $j$ of the ring or bar under it and so on.

It is obvious that by placing over the pulp a plate with embossments in cameo or intaglio corresponding embossments in intaglio or cameo would be produced in the pulp. It will also be obvious that the apparatus is adapted to the compression of powdered materials, which lend themselves to conglomeration by pressure, the form shown in Fig. 3 being especially suitable for such materials.

The operation is as follows: The cylindrical molds being arranged, as shown in Fig. 3, in the press, with the largest on top and the smallest at the bottom, pressure is applied, as described, with regard to the rectangular molds and their contents, the said molds being telescoped thereby and the comminuted material within them compressed, while the liquid escapes, as before stated. The frames $b'$ $b^2$ $b^3$ $b^4$ limit the telescoping action, as before stated, and the plates $l$ $l$ are fastened together, as above explained, with regard to the rectangular molds and frames, holding the series of molds securely in the position given them by such compressing action. Of course in all cases the surrounding frames must conform to the molds, those used with the rectangular molds (shown in Fig. 1) being rectangular and those used with the cylindrical molds (shown in Fig. 3) being cylindrical. In the latter case the eyelets $j$ permit the pins $k$ to move up or down in them while preventing any lateral motion, and thus guide the molds in their telescoping movement.

Having fully described my invention, what I claim, and desire to secure by Letters Patent, is—

1. In compressing mechanism, the combination of a series of superposed telescopic molds regularly increasing in size with locking bars or rings $b'$ individually surrounding them, perforated locking-plates $l$ arranged at the top and bottom of the series, the base and frame of the press, the movable platen $p$ arranged to bear on the top of the series and bolts adapted to pass through the perforations in the said plates and fasten the series of molds in the position of compression, substantially as set forth.

2. In compressing mechanism, the combination of a series of superposed telescopic molds regularly increasing in size with locking bars or rings $b'$ individually surrounding them, perforated locking-plates $l$ arranged at the top and bottom of the series, the base and frame of the press, the movable platen $p$ arranged to bear on the top of the series and bolts adapted to pass through the perforations in the said plates and fasten the series of molds in the position of compression, the said locking plates and molds being grooved to allow the escape of expressed liquid and each of the said molds being provided with upper and lower grooved plates $g$ and interposed upper and lower layers of wood on end fiber and a spring blade or plate $s$ being applied on top of the uppermost mold.

In testimony whereof I affix my signature in presence of two witnesses.

JAMES WESTAWAY.

Witnesses:
GEORGE DASH MEVILLE,
WALTER JAMES SKERTEN.